(12) United States Patent
Pulfer

(10) Patent No.: US 6,711,801 B2
(45) Date of Patent: Mar. 30, 2004

(54) METHOD OF ASSEMBLING A FASTENER ASSEMBLY AND OF SECURING A FASTENER ASSEMBLY

(76) Inventor: Hal W. Pulfer, 1824 Balsam Rd., Highland Park, IL (US) 60035

( * ) Notice: Subject to any disclaimer, the term of this patent is extended or adjusted under 35 U.S.C. 154(b) by 0 days.

(21) Appl. No.: 10/124,180

(22) Filed: Apr. 17, 2002

(65) Prior Publication Data

US 2003/0196313 A1 Oct. 23, 2003

(51) Int. Cl.⁷ .............................................. B23P 19/00
(52) U.S. Cl. ................... 29/456; 29/525.02; 29/525.05; 29/525.11; 411/180; 411/181; 411/282
(58) Field of Search ............................ 29/456, 525.02, 29/525.05, 525.11; 411/333, 334, 335, 937, 937.1, 166, 167, 168, 169, 180, 181, 282; 470/1, 2, 19, 20

(56) References Cited

U.S. PATENT DOCUMENTS

| | | | | |
|---|---|---|---|---|
| 1,166,203 A | * | 12/1915 | Green | 411/242 |
| 1,183,556 A | * | 5/1916 | Green | 411/222 |
| 1,400,154 A | * | 12/1921 | Green | 411/223 |
| 1,603,901 A | * | 10/1926 | Brownlee | 411/246 |
| 1,683,501 A | * | 9/1928 | Tobeler | 83/143 |
| 1,986,891 A | * | 1/1935 | Green | 411/233 |
| 2,490,594 A | * | 12/1949 | Madden | 411/180 |
| 2,754,871 A | * | 7/1956 | Stoll | 411/283 |
| 3,129,630 A | * | 4/1964 | Wing et al. | 411/43 |
| 3,198,230 A | * | 8/1965 | Stover, III | 411/282 |
| 3,265,109 A | * | 8/1966 | Hanfland | 411/291 |
| 3,277,942 A | * | 10/1966 | Dwyer | 411/284 |
| 3,311,146 A | * | 3/1967 | Storch | 411/277 |
| 3,311,147 A | * | 3/1967 | Walker | 411/276 |
| 3,324,920 A | * | 6/1967 | Brown | 411/285 |
| 3,340,920 A | * | 9/1967 | Johnson | 411/282 |
| 3,352,342 A | * | 11/1967 | Jacobson | 411/282 |

(List continued on next page.)

*Primary Examiner*—Peter Vo
*Assistant Examiner*—Essama Omgba
(74) *Attorney, Agent, or Firm*—Barnes & Thornburg

(57) ABSTRACT

The present invention in accordance with one embodiment provides a method for securing a threaded fastener to an object having a surface, the method comprising the steps of: (a) defining in the object with an inner wall a threaded hole, a bore contiguous with the threaded hole, and a slot contiguous with the bore, the bore being disposed between the threaded hole and the surface; (b) inserting into the bore a fastener assembly including the threaded fastener, an internally-threaded retainer disposed about the threaded fastener having a lug such that the internally-threaded retainer is received by the bore and the lug is received by the slot to rotatably lock the collar to the inner wall, the internally-threaded collar having a substantially elliptical shape that is distorted to provide rotational resistance between the threaded fastener and the internally-threaded collar; and (c) rotating the threaded fastener relative to the internally-threaded collar and the surface to engage a portion of the inner wall defining the threaded hole. The distorted shape of the internally-threaded collar desirably provides the rotational resistance. In a preferred embodiment, the method further includes prior to step (b) the step of securing the internally-threaded collar to the threaded fastener. The securing step may also include the step of distorting the elliptical shape of the internally-threaded collar. The present invention also provides a method of assembling such a fastener assembly.

20 Claims, 2 Drawing Sheets

U.S. PATENT DOCUMENTS

| | | | | |
|---|---|---|---|---|
| 3,354,926 A | * | 11/1967 | Mattick | 411/282 |
| 3,412,772 A | * | 11/1968 | Meyfarth et al. | 411/282 |
| 3,431,959 A | * | 3/1969 | Beebe et al. | 411/282 |
| 3,433,280 A | * | 3/1969 | Reusser | 411/282 |
| 3,456,704 A | * | 7/1969 | Johnson | 411/284 |
| 3,459,249 A | * | 8/1969 | Jordan et al. | 411/282 |
| 3,496,582 A | * | 2/1970 | Johnson | 470/19 |
| 3,543,826 A | * | 12/1970 | Forgaard | 411/284 |
| 3,621,502 A | * | 11/1971 | Velthoven | 470/19 |
| 3,678,978 A | * | 7/1972 | Davis et al. | 411/282 |
| 3,729,757 A | * | 5/1973 | Wright | 470/19 |
| 3,841,371 A | * | 10/1974 | Thurston | 411/276 |
| 3,952,785 A | * | 4/1976 | Werner | 411/282 |
| 4,291,737 A | * | 9/1981 | McMurray et al. | 411/282 |
| 4,352,219 A | * | 10/1982 | McMurray et al. | 470/19 |
| 5,033,924 A | * | 7/1991 | Cosenza | 411/282 |
| 5,395,194 A | * | 3/1995 | Johnson et al. | 411/353 |
| 5,499,893 A | * | 3/1996 | Thurston et al. | 411/282 |
| RE36,164 E | * | 3/1999 | Johnson et al. | 411/353 |

* cited by examiner

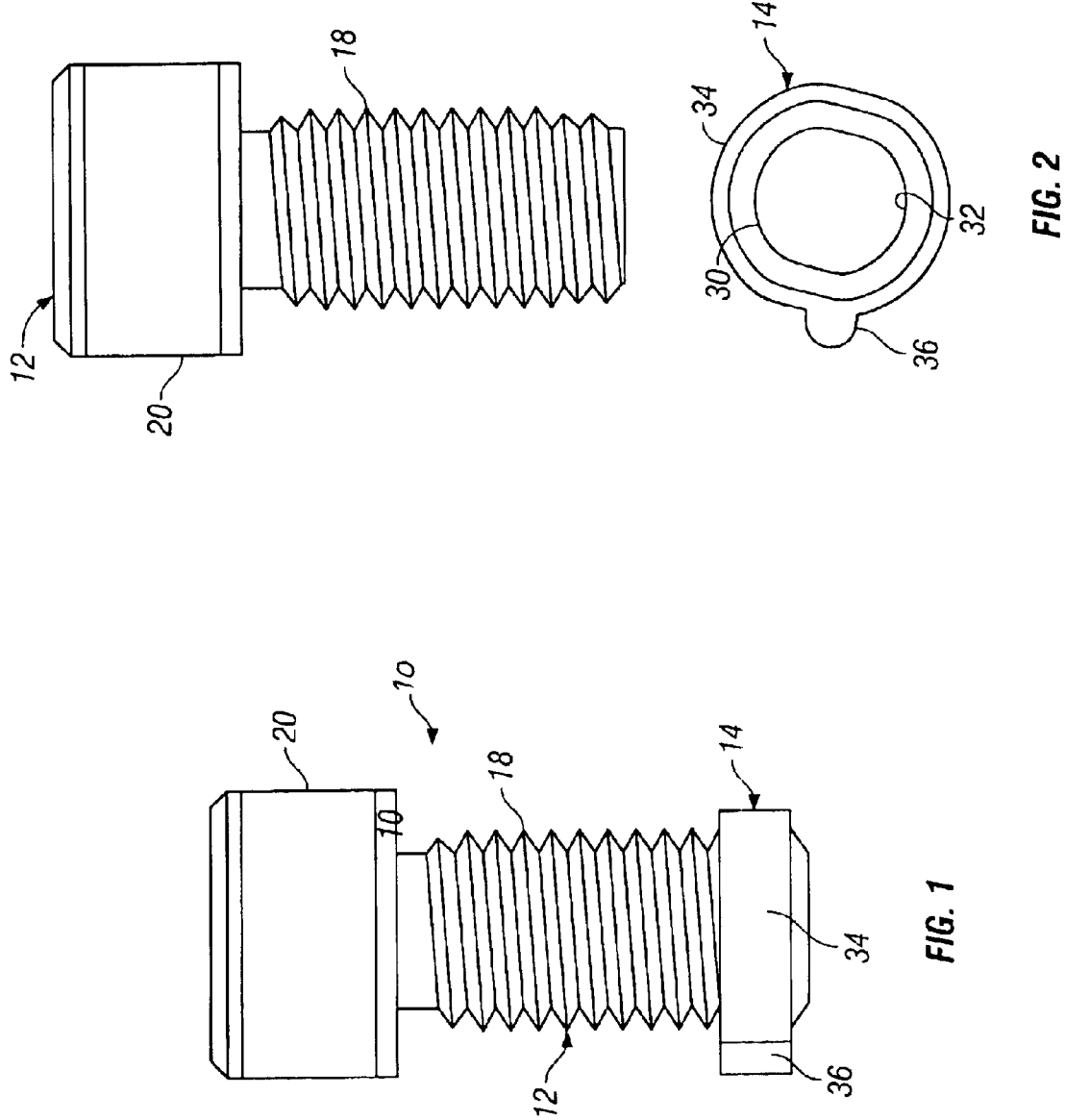

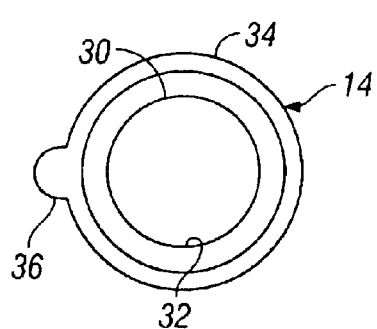
FIG. 3
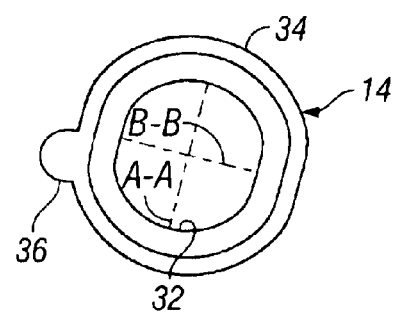
FIG. 4
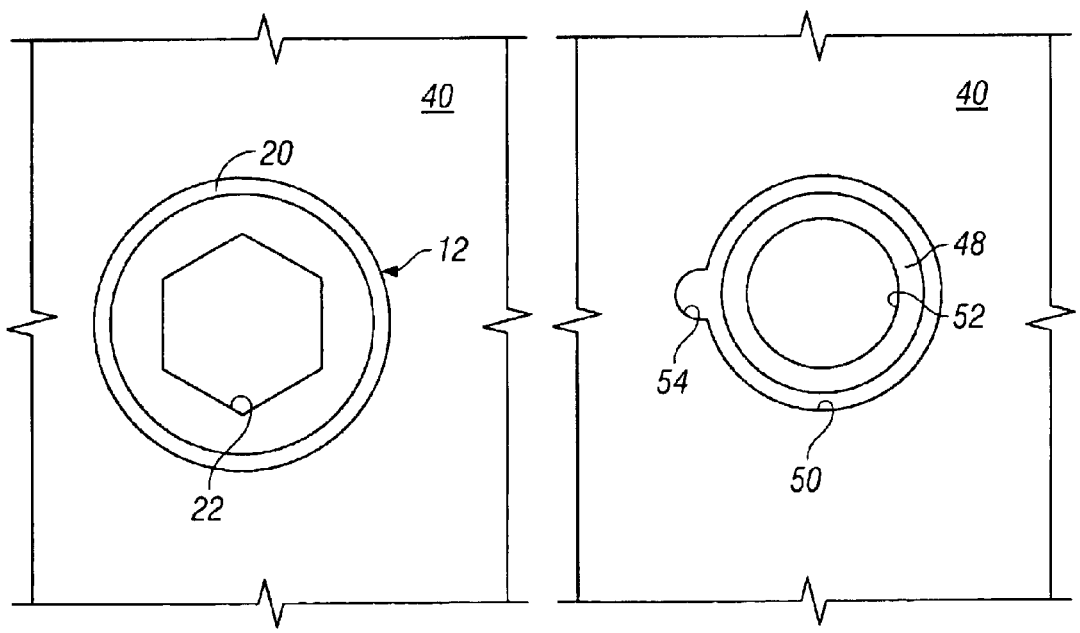
FIG. 5  FIG. 6

METHOD OF ASSEMBLING A FASTENER ASSEMBLY AND OF SECURING A FASTENER ASSEMBLY

The present invention is directed to a fastener assembly for securing the fastener to an object, such as a frame, a wall or other structure.

BACKGROUND

U.S. Pat. No. 1,986,891, entitled "Nut and Retainer", describes a nut, retainer and bolt assembly for securing together work pieces. The nut of the assembly of the '891 patent incorporates a retainer having a generally elliptical shape that is distorted to provide rotational resistance between the retainer and the nut to prevent loosening of the bolt. The '891 patent, and U.S. Pat. Nos. 1,166,203 and 1,400,154 referenced therein, are incorporated herein by reference. An object of the present invention is to provide a method of securing a fastener assembly to an object such as, for example, an object or any other structure.

SUMMARY

The present invention in accordance with one embodiment provides a method for securing a threaded fastener to an object having a surface, the method comprising the steps of: (a) defining in the object with an inner wall a threaded hole, a bore contiguous with the threaded hole, and a slot contiguous with the bore, the bore being disposed between the threaded hole and the surface; (b) inserting into the threaded bore a fastener assembly including the threaded fastener, an internally-threaded retainer disposed about the threaded fastener having a lug such that the internally-threaded retainer is received by the bore and the lug is received by the slot to rotatably lock the retainer to the inner wall, the internally-threaded retainer having a substantially elliptical shape that is distorted to provide rotational resistance between the threaded fastener and the internally-threaded retainer; and (c) rotating the threaded fastener relative to the internally-threaded retainer and the surface to engage a portion of the inner wall defining the threaded hole. The distorted shape of the internally-threaded retainer desirably provides the rotational resistance. In a preferred embodiment, the method further includes prior to step (b) the step of securing the internally-threaded retainer to the threaded fastener. The securing step may also include the step of distorting the elliptical shape of the internally-threaded retainer.

The present invention also provides a method of assembling such a fastener assembly. The method may comprise the steps of: (a) providing a retainer having a substantially elliptical shape and a threaded inner wall defining a through hole; and (b) threadingly engaging a threaded fastener with the threaded inner wall to distort the substantially elliptical shape of the retainer to provide rotational resistance between the fastener and the retainer. Desirably, prior to step (a), the retainer has a substantially circular shape and the method further includes the step of squeezing the retainer to achieve the substantially elliptical shape. The method also may include the step of heat treating the retainer after it has been squeezed. In a preferred embodiment, the retainer includes an outer surface and a lug associated with the outer surface for engaging a frame.

Additional features of the present disclosure will become apparent to those skilled in the art upon consideration of the following detailed description of illustrative embodiments exemplifying the best mode of carrying out the present disclosure as presently perceived.

DESCRIPTION OF THE DRAWINGS

FIG. 1 is a perspective of a fastener assembly in accordance with a preferred embodiment;

FIG. 2 is an exploded view of the fastener assembly of FIG. 1;

FIG. 3 is a plan view of the collar of FIGS. 1 and 2 before it has been engaged with the fastener but before it has been deformed to a substantially elliptical shape;

FIG. 4 is a plan view of the collar of FIG. 3 before it has been engaged with the fastener but after it has been deformed to a substantially elliptical shape;

FIG. 5 is a broken plan view of the fastener assembly of FIG. 1 secured to a frame; and FIG. 6 is a broken plan view of the frame of FIG. 5, illustrating the threaded hole and bore defined by the frame for receiving the fastener assembly.

DETAILED DESCRIPTION OF THE ILLUSTRATED EMBODIMENT

FIGS. 1 and 2 illustrate generally a fastener assembly 10 in accordance with a preferred embodiment comprising generally a threaded fastener 12 and an internally-threaded collar 14. The threaded fastener 12 may have any suitable size and shape. In the illustrated embodiment, for example, the threaded fastener 12 is in the form of a threaded bolt having a stem 18 and a bolt head 20 defining a recess 22 for receiving an alien wrench or the like.

The illustrated internally-threaded collar 14 includes a threaded inner wall 30 defining a threaded through hole 32, and an outer surface 34. The collar 14 desirably includes any suitable locking structure for rotatably locking the collar to any suitable object, such as, for example, one or more lugs, knurls, keyways, dowel pins or the like. In the illustrated embodiment, for example, the outer surface 34 includes at least one lug 36 having any suitable size or configuration for engaging the object in any suitable manner. The illustrated lug 36, for example, has a semi-circular configuration and may extend the substantial length of the retainer. The illustrated lug 36 is beveled on each end. In accordance with alternative embodiments, the internally threaded collar 14 may include additional lugs 36 and the one or more lugs 36 may have configurations different than the illustrated configuration.

Before the internally-threaded collar 14 is engaged with the fastener 12, it has a substantially circular shape, as illustrated, for example, in FIG. 3. The collar 14 having the configuration of FIG. 3 is then deformed to achieve the substantially elliptical shape of FIG. 4. The deformation can be achieved in any suitable manner. In accordance with one embodiment, for example, the collar 14 may be squeezed by any suitable former or tool die to achieve the substantially elliptical configuration as illustrated, for example, in FIG. 4. Desirably, after the collar 14 is squeezed, the collar is heat treated to solidify the substantially elliptical shape. The fastener 12 and the collar 14 may be constructed of any suitable material, and the extent and nature of the heat treating depends upon the application and material used. For example, if the collar is constructed of C-series metal, the collar desirably may be heat treated to a Rockwell Hardness in the range of Rc 35 or greater. After deformation, the substantially elliptical shape of the collar 14 may have any suitable configuration such that the collar 14 has a maximum diameter A—A and a minimum diameter B—B, with the maximum diameter A—A exceeding the minimum diameter B—B (see, e.g., FIG. 4).

The collar 14 of FIG. 4 is then engaged with the threaded fastener 12, causing distortion of the substantially elliptical shape of the collar 14. The distortion occurs because the stem 18 has a circular cross section. The distortion decreases the maximum outer diameter A—A, but after distortion, the maximum outer diameter A—A remains greater than the minimum outer diameter. The distortion may also cause the shape of the collar 14 to lose symmetry. The collar 14 may be engaged with the threaded fastener 12 in any suitable manner. For example, the collar 14 may be positioned in a vise or the like and the threaded fastener 12 may be inserted into the through hole 32 of the collar, and rotated by, for example, an allen wrench, socket driver, wrench or the like.

The fastener assembly 10 in a preferred embodiment can be readily and easily secured to any suitable object having a surface. The object 40 may be in the form of any type of structure or component or the like that is intended to remain stationary during the rotation of the fastener 12 relative to the object. The object 40 may be in the form of an apparatus or device that itself is moveable. The illustrated surface 42 desirably is in the form of a flat surface associated with the object 40. Thus, with the present invention, the fastener 12 and collar 14 desirably are engaged directly together before insertion into the hole. The fastener assembly 10 may be used in a blind hole application, or a through hole application wherein the object remains stationary during the rotation of the fastener relative to the object. The fastener assembly 10 may be used in any industry.

The illustrated object 40 includes an inner wall 48 defining a bore 50, a threaded hole 52 contiguous with the bore, and at least one slot 54 also contiguous with the bore. The bore 50 is disposed between the threaded hole 52 and the surface 42. The slot 54 is configured to receive the lug 36 as hereinafter described and, thus, in the illustrated embodiment, has a semi-circular configuration. If desired, one or more additional slots 54 may be included, especially if the fastener assembly 10 includes one or more additional lugs 36, and the one or more additional slots may have any suitable configuration for receiving the one or more lugs 36.

The illustrated fastener assembly 10 may be secured to the object 40 by inserting the fastener assembly into the bore 50 such that the collar 14 is received by the bore and the lug 36 is received by the slot 54. The fastener 12 is rotated desirably by a manual socket driver, an allen wrench, or the like so its threads engages the threads of the inner wall 48 defining the threaded hole 52. As the fastener 12 rotates, a rotational resistance results from the collar 14 due to its distorted condition such that a strong lock is provided between the collar and the fastener to secure the fastener to the object 40 and to prevent unlocking. Further rotation of the fastener 12 enhances the securement as the fastener 12 is drawn further into the threaded hole 52.

While preferred embodiments have been illustrated and described in detail in the drawings and foregoing description, such illustrations and descriptions are to be considered as exemplary and not restrictive in character, it being understood that only illustrative embodiments have been shown and described and that all changes and modifications that come within the spirit of the invention are desired to be protected.

There are a plurality of advantages of the present disclosure arising from the various features and associated method described herein. It will be noted that alternative embodiments of the invention of the present disclosure may not include all of the features described yet still benefit from at least some of the advantages of such features. Those of ordinary skill in the art may readily device their own implementations that incorporate one or more of the features of the present disclosure and fall within the spirit and scope of the present disclosure as defined by the appended claims.

The claimed invention is:

1. A method for securing a threaded fastener to an object having a surface, the method comprising the steps of:
   (a) defining in the object with an inner wall a threaded hole, a bore contiguous with the threaded hole, and a slot contiguous with the bore, the bore being disposed between the threaded hole and the surface;
   (b) disposing an internally-threaded collar having a lug about the threaded fastener to form a fastener assembly; and then
   (c) inserting into the bore the fastener assembly such that the internally-threaded collar is received by the bore and the lug is received by the slot to rotatably lock the collar to the inner wall, the internally-threaded collar having a substantially elliptical shape that is distorted; and
   (d) rotating the threaded fastener relative to the internally-threaded collar and the surface to engage a portion of the inner wall defining the threaded hole.

2. The method of claim 1 wherein during step (d) the distorted shape of the internally-threaded collar provides rotational resistance relative to the threaded fastener.

3. The method of claim 1 wherein the disposing step includes distorting the substantially elliptical shape of the internally-threaded collar.

4. A method for securing a threaded fastener to an object have a surface, the method comprising the steps of:
   (a) defining in the object with an inner wall a threaded hole, a bore contiguous with the threaded hole, and a slot contiguous wit the bore, the bore being disposed between the threaded hole and the surface;
   (b) disposing an internally-threaded collar having a lug about the threaded fastener to form a fastener assembly; and then
   (c) inserting into the bore the fastener assembly such that the internally-threaded collar is received by the bore and the lug is received by the slot to rotatably lock the internally-threaded collar to the inner wall, the internally-threaded collar having a substantially elliptical shape that is distorted; and
   (d) rotating the threaded fastener relative to the internally-threaded collar and the surface to engage a portion of the inner wall defining the threaded hole, the distorted shape of the internally-threaded collar providing rotational resistance between the threaded fastener and the internally-threaded collar.

5. The method of claim 4 wherein during the disposing step the substantially elliptical shape of the internally-threaded collar is distorted.

6. A method of securing a threaded fastener to an object having a surface and having defined therein by an inner wall a threaded hole, a bore contiguous with the threaded hole, and a slot contiguous with the bore, the bore being disposed between the threaded hole and the surface, the method comprising the steps of:
   (a) disposing an internally-threaded collar having a lug about the threaded fastener to form a fastener assembly; and then
   (b) inserting into the bore the fastener assembly including the threaded fastener and a substantially elliptical internally-threaded collar disposed about the fastener having a lug such that the internally-threaded collar is received by the bore and the lug is received by the slot to rotatably lock the collar to the inner wall, the substantially elliptical shape of the internally-threaded collar being distorted; and (c) rotating the threaded fastener relative to the internally-threaded collar and the surface to engage a portion of the inner wall defining the threaded hole.

7. The method of claim 6 wherein during step (c) the internal threads of the internally-threaded collar resist the rotation of the threaded fastener relative to the internally-threaded collar.

8. A method for securing a threaded fastener to an object having a surface, the method comprising the steps of:

(a) squeezing a circular collar having a locking structure and an inner threaded first wall defining a first hole so the collar has a substantially elliptical shape;

(b) forming a fastener assembly by threadingly engaging the threaded fastener with the threaded inner first wall to distort the substantially elliptical shape of the collar to provide rotational resistance between the threaded fastener and the collar;

(c) defining in the object with a second inner wall a second hole, a bore contiguous with the second hole, and a slot contiguous with the bore, a portion of the second inner wall defining the hole being threaded, the bore being disposed between the second hole and the surface;

(d) inserting into the bore the threaded fastener assembly such that the collar is received by the bore and the locking structure is received by the slot to rotatably lock the collar to the object; and (e) rotating the threaded fastener relative to the collar and the object to engage the threaded portion of the inner second wall.

9. The method of claim 8 further including the step of heat treating the collar after step (a).

10. The method of claim 8 wherein the locking structure comprises at least one lug.

11. A method for securing a threaded fastener to an object having a surface, the method comprising the steps of:

(a) defining in the object with an inner wall a threaded hole, a bore contiguous with the threaded hole, and a slot contiguous with the bore, the bore being disposed between the threaded hole and the surface;

(b) disposing an internally-threaded collar having a lug about the threaded fastener to form a fastener assembly; and then (c) inserting into the bore the fastener assembly such that the internally-threaded collar is received by the bore and the lug is received by the slot to rotatably lock the collar to the inner wall, the internally-threaded collar defining a collar hole receiving the threaded fastener having a substantially elliptical shape that is distorted; and (d) rotating the threaded fastener relative to the internally-threaded collar and the surface to engage a portion of the inner wall defining the threaded hole.

12. The method of claim 11 wherein during step (d) the internally-threaded collar provides rotational resistance relative to the threaded fastener.

13. The method of claim 11 wherein during the disposing step the shape of the internally-threaded collar is distorted.

14. A method for securing a threaded fastener to an object having a surface, the method comprising the steps of:

(a) defining in the object with an inner wall a threaded hole, a bore contiguous with the threaded hole, and a slot contiguous with the bore, the bore being disposed between the threaded hole and the surface;

(b) disposing an internally-threaded collar having a lug about the threaded fastener to form a fastener assembly; and then (c) inserting into the bore the fastener assembly such that the internally-threaded collar is received by the bore and the lug is received by the slot to rotatably lock the internally-threaded collar to the inner wall, the internally-threaded collar having a distorted shape and defining a collar hole receiving the threaded fastener having a substantially elliptical shape that is distorted; and (d) rotating the threaded fastener relative to the internally-threaded collar and the surface to engage a portion of the inner wall defining the threaded hole, the distorted shape of the internally-threaded collar providing rotational resistance between the threaded fastener and the internally-threaded collar.

15. The method of claim 14 including prior to step (b) the step of securing the internally-threaded collar to the threaded fastener to distort the shape of the internally-threaded collar and the collar hole.

16. A method of securing a fastener to an object having a surface and having defined therein by an inner wall a threaded hole, a bare contiguous with the threaded hole, and a slot contiguous with the bore, the bore being disposed between the threaded hole and the surface, the method comprising the steps of:

(a) disposing an internally-threaded collar having a lug about a threaded fastener to form a fastener assembly; and then (b) inserting into the bore the fastener assembly such that the internally-threaded collar is received by the bore and the lug is received by the slot to rotatably lock the collar to the inner wall, the internally-threaded collar defining a collar hole receiving the threaded fastener having a substantially elliptical shape that is distorted; and (c) rotating the threaded fastener relative to the internally-threaded collar and the surface to engage a portion of the inner wall defining the threaded hole.

17. The method of claim 16 wherein during step (b) the internal threads of the internally-threaded collar resist the rotation of the threaded fastener relative to the internally-threaded collar.

18. A method for securing a threaded fastener to an object having a surface, the method comprising the steps of:

(a) squeezing a circular collar having a locking structure and an inner threaded first wall defining a first hole so that the first hole has a substantially elliptical shape;

(b) forming an assembly by threadingly engaging the threaded fastener with the threaded inner first wall to distort the substantially elliptical shape of the first hole to provide rotational resistance between the threaded fastener and the collar;

(c) defining in the object with a second inner wall a second hole, a bore contiguous with the second hole, and a slot contiguous with the bore, a portion of the second inner wall defining the second hole being threaded, the bore being disposed between the second hole and the surface;

(d) inserting the assembly into the bore such that the collar is received by the bore and the locking structure is received by the slot to rotatably lock the collar to the object; and (e) rotating the threaded fastener relative to the collar and the object to engage the threaded portion of the inner second wall.

19. The method of claim 18 further including the step of heat treating the collar after step (a).

20. The method of claim 18 wherein the locking structure comprises at least one lug.

* * * * *